United States Patent
Broemmelsiek

[19]

[11] Patent Number: 5,574,836
[45] Date of Patent: Nov. 12, 1996

[54] INTERACTIVE DISPLAY APPARATUS AND METHOD WITH VIEWER POSITION COMPENSATION

[76] Inventor: Raymond M. Broemmelsiek, 9465 Maler Rd., San Diego, Calif. 92129

[21] Appl. No.: 589,189

[22] Filed: Jan. 22, 1996

[51] Int. Cl.[6] .................................................. G06F 3/14
[52] U.S. Cl. .............................. 395/127; 345/112; 345/9; 348/51
[58] Field of Search .................................. 395/121, 127, 395/157, 158; 345/118, 119, 120, 178, 4, 6, 7, 9; 348/42, 51, 58

[56] References Cited

U.S. PATENT DOCUMENTS

| | | | |
|---|---|---|---|
| 4,065,202 | 12/1977 | Kurtz | 350/3.5 |
| 4,479,784 | 10/1984 | Mallinson et al. | 434/43 |
| 4,649,425 | 3/1987 | Pund | 358/88 |
| 4,736,199 | 4/1988 | Chadwick et al. | 340/728 |
| 4,910,683 | 3/1990 | Bishop et al. | 364/518 |
| 4,984,179 | 1/1991 | Waldern | 364/514 |
| 4,985,762 | 1/1991 | Smith | 358/87 |
| 5,040,055 | 8/1991 | Smith | 358/87 |
| 5,083,199 | 1/1992 | Börner | 358/88 |
| 5,193,148 | 3/1993 | Alcorn et al. | 395/157 |
| 5,257,345 | 10/1993 | Malm | 395/119 |
| 5,276,785 | 1/1994 | Mackinlay et al. | 395/127 |
| 5,287,437 | 2/1994 | Deering | 395/127 |
| 5,311,220 | 5/1994 | Eichenlaub | 348/55 |
| 5,349,379 | 9/1994 | Eichenlaub | 348/59 |
| 5,422,653 | 6/1995 | Maguire, Jr. | 345/9 |
| 5,475,812 | 12/1995 | Corona et al. | 395/158 |
| 5,497,454 | 3/1996 | Bates et al. | 395/158 |

FOREIGN PATENT DOCUMENTS

| | | | |
|---|---|---|---|
| 8502049 | 5/1985 | WIPO | 345/120 |

OTHER PUBLICATIONS

Shires, A New Graphics Coprocessor–The Intel 82786, IEEE CG & A, Oct. 1986, pp. 49–55 (IEEE).

*Primary Examiner*—Mark R. Powell
*Assistant Examiner*—Vincent E. Kovalick
*Attorney, Agent, or Firm*—Jonathan A. Small

[57] ABSTRACT

An object-oriented display system which displays an image of a graphical object on a display device, the position at which the object is displayed being a function of the position from which a viewer views the display device so as to simulate an interactive, three-dimensional viewing environment.

An object-oriented display system, in which the highest discernible level of data in the frame buffer is an object with preserved association of pixels to the object allows dynamic selection of view. View position data may be employed on-the-fly to dynamically determine display from an arbitrary view position. Object data storage in tile format allows for rapid and simplified display generation.

18 Claims, 11 Drawing Sheets

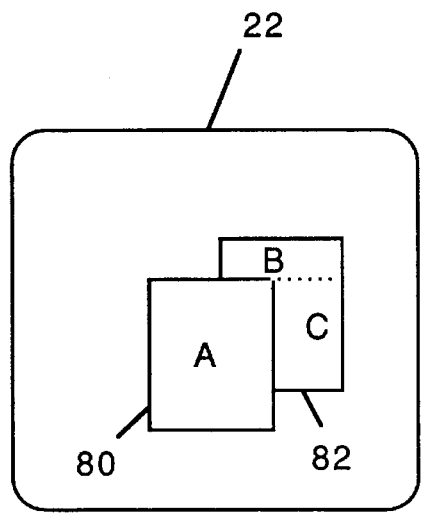 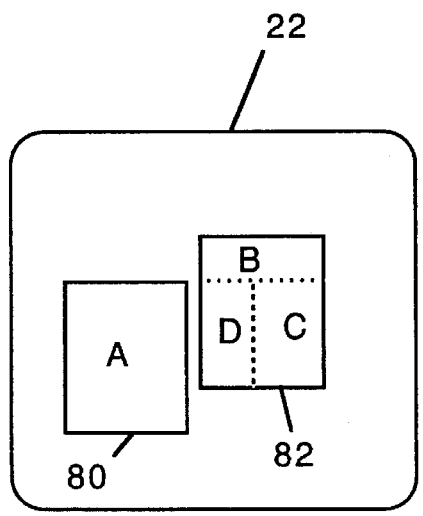
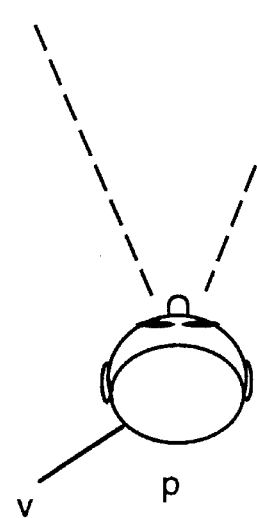 
Fig. 2A  Fig. 2B

INTERACTIVE DISPLAY APPARATUS AND METHOD WITH VIEWER POSITION COMPENSATION

BACKGROUND OF THE INVENTION

1. Field of the Invention

The present invention relates to methods and apparatus for displaying computer-resident data, such as graphical information for display on a computer monitor. More specifically, the present invention relates to the writing of display data into a pool of arbitrarily selected tiles for subsequent ordering and rendering onto a display. When operated in conjunction with a view position sensing apparatus, display of multiple objects, such as windows, as a function of viewing position is provided. It is therefore possible to display objects such as windows, which are typically displayed in a static, two dimensional display space, in a simulated three dimensional, dynamic display space. That is, the present invention facilitates providing a viewer with a relative view or parallax perspective of the displayed objects.

2. Description of the Prior Art

There is presently a problem associated with displaying objects on a computer display device (generally referred to herein as a monitor) that the physical area within which the objects are displayable is limited by the surface area of the display portion of the display device. For example, the target area or active pixel portion ("screen") of cathode ray tubes, liquid crystal or plasma panels or the like employed in computer monitors have a finite width (x-dimension) and height (y-dimension), and objects to be displayed by such devices must be displayed within the dimensions of the screen.

While efforts have been made to simulate depth (z-dimension) of the display to provide a three-dimensional display space, in most computing applications objects are most commonly displayed in two dimensions. For example, display windows found in modern windowing systems are presented to the user as if directly on the surface of the monitor, with virtually no depth. Similar limitations are found in computer aided design (CAD) programs, illustration programs, page layout programs, etc.

There is a further problem with display methods and devices in that most often they do not account for the position of the user with respect to the display device. For example, while a sophisticated computer animation program is capable of synthesizing a three-dimensional view of an object by shading, highlighting, cropping, and other visual cues, such programs assume a fixed position of the viewer with respect to the display device. This limitation means that in displaying objects—even three—dimensionally rendered objects—there is no accommodation for the relative position of those objects with respect to the viewer. For example, while overlapping windows are known in the art, that part of a window overlapped by another window is clipped, and a change in viewing position does not change the portion of the window which is clipped. The same holds true for more dynamic environments such as video games, etc. The relative position of objects with respect to the viewer provides significant depth cues; specifically of interest in the present case is the "parallax" of the displayed objects.

Parallax occurs when simultaneously viewing at least two objects which are each at a different distance from the viewer. Each object is viewed in a line of sight. Motion of the viewer relative to the objects changes the line of sight and produces a new perspective of the objects. As the line of sight changes, the two objects appear to have changed position relative to one another. This effect is called parallax.

In the physical world, the degree to which two objects appear to have moved relative to one another when viewed at two different viewing positions is a function of their respective distances from the viewer. For example, as the viewer moves, the object closer to the view appears to move more than the object farther from the viewer. In general, the greater the distance between the objects, the greater the visual effect. These relative changes in position are one type of visual cue providing information about the positions, sizes, motion, etc. of viewed objects.

I have discovered that a user's perception of the three-dimensionality of displayed computer-generated images is greatly enhanced when parallax shift of the displayed objects is provided. In addition, it is possible to "extend" the viewing area of a display beyond the physical boundaries of the monitor by providing a parallax effect; in a sense allowing the user to peer around the edges of the display into a virtual display space. These techniques rely on a system of software and hardware forming an aspect of this invention which departs from the tradition serial method of writing to display buffers and reading out the display buffers scan line-by-scan line. The present invention may employ novel hardware and software for tracking the position from which the display is viewed by a user.

Typical systems for displaying computer-based data include a graphics engine which interprets commands from a microprocessor. The graphics engine generates pixel data which is written to a frame buffer. This frame buffer is essentially a display address bit map; each address in the frame buffer stores pixel data for a single pixel of the display. Most often, the frame buffer is organized to correspond in size and bit sequence to a scan line of the monitor The data is loaded from the frame buffer to a shift register. The data is then clocked out by the shift register to a color palette chip, and ultimately drives the display of a scan line on the monitor.

The process associated with such a system is bit-mapped in nature. That is, the pixels are written to and read from the frame buffer in an order advantageous for serial read-out to the display. The pixel ordering in the frame buffer has no explicit regard for their association with the object which they represent nor the distinction between objects. The nature of this strictly bit-mapped process becomes disadvantageously slow, and in many cases impracticable, when the process is called upon to display a dynamically selected view of data, for example, when panning an environment in a so-called virtual reality (VR) application.

Such systems are referred to herein as pixel-oriented, because the highest discernible level of data organization in the frame buffer is a pixel. The present invention is an alternative approach to the pixel-oriented system. Referred to as an object-oriented system, the highest discernible level of data in the frame buffer is an object. That is, the pixels are written to and read from the frame buffer in a way that preserves the association of pixels to an object. This association is advantageous for positioning of objects to render a dynamically selected view of data. Object-oriented frame buffers for a dynamically selected view of the data are not known in the art.

In order to provide such a parallax perspective, it must be possible to determine information regarding the user's viewing position and the use of that information to tailor the display accordingly. A number of techniques are known to track the position of the viewer, and display objects as a function of viewing position. Examples of apparatus developed for tracking viewing position include head-tracking goggles, glasses or helmets. These display devices are worn by a user and usually include control over the projection of different images to each of the user's left and right eyes to simulate a stereoscopic display. Motion of these devices relative to some fixed point as determined by appropriate means usually controls the display of objects, for example providing relative motion as between two displayed objects.

One example of these methods and devices include U.S. Pat. No. ('179) to Waldern, which discloses wearing a helmet outfitted with one video display unit for each eye, the motion of the helmet tracked to provide a visualized virtual model. Another example is U.S. Pat. No. ('055) to Smith, which discusses using video glasses to allow a user's head position to determine which portion of a panorama is displayed to the viewer.

However, there are numerous problems with these devices. For example: the hardware and software resources needed to operate these devices are expensive and complex; in stereoscopic display systems, they require the recording and/or rendering of two separate images, one for each eye; the image updates lag substantially behind viewer movements resulting in motion sickness of the user; they provide inferior display quality either by reducing the animation rate or the display resolution; etc. For these reasons, special purpose, expensive display systems have been the only means for determining viewing position information and using that information when generating a display of data.

In addition, known systems providing view position sensing have required stereoscopic displays where a separate image is generated for each eye. The lack of an autoscopic (single image) display with viewing position tracking has meant that applications running on relatively inexpensive, desktop computer systems or low-end graphics workstations have not been able to employ either meaningful view position sensing or the parallax effect.

The lack of practical, low cost view position-sensitive display capability precludes the application of the parallax effect to routine computer applications such as drawing programs, word processing and spreadsheets, etc. Examples of areas where there is a need for parallax display include those applications where there are a large number of objects to be displayed simultaneously, or where the size of the objects to be displayed require a display area greater than that of the screen. Such is the case, for example, in computer-aided design systems, where multiple "windows" of varying size need to be displayed, preferably simultaneously. Another example comes from the art of video games where there is often a desire to simultaneously display multiple objects such as opponents, background, etc., or to provide the player with the impression that she is actually in a room or other environment in which the game is being played. Parallax perspective will benefit any application in which a three-dimensional display space is being synthesized.

SUMMARY OF THE INVENTION

The present invention addresses the problems recited above, as well as others further detailed herein, by providing object-oriented display generation capability together with view position sensing. A display system is thereby provided which allows practical view position sensitive display, for example parallax display, in arbitrary object-based computer environments such as windowing environments, video games, etc.

In order to employ viewing position in the display of data, the present invention employs a view position sensing apparatus. Examples of this apparatus include ultrasonic and infrared (IR) triangulated range finders and similar apparatus. This preferred type of apparatus does not require that the user wear or carry a component of the sensing apparatus. However, other types of sensing apparatus, such as ultrasonic and IR transponder/receiver pairs, mechanical position tracking mechanisms and the like may be employed.

The appropriate position sensing apparatus produces view position data which is employed to produce an appropriate display as a function of view position. For example, in a double buffered graphics system, a transformation matrix is developed to transform data displayed from the perspective of a first viewing position to data displayed from the perspective of a second viewing position based on the position data provided by the view position sensing apparatus. Importantly, it is possible to perform this transformation on arbitrary graphical display objects, such as windows.

The present invention can operate with, and form a part of, various computer architectures. For example, in one embodiment, the present invention operates with, and forms a part of, a standard double-buffering computer graphics system. The position sensing apparatus provides data, used by the system to generate the display.

In another embodiment of the present invention, a special architecture is employed to provide an object-oriented frame buffer herein referred to as an object buffer to enable display speed performance necessary for certain display environments. According to this embodiment, the object buffer is composed of a pool to allocable tiles from a read-writable random access memory. The object buffer is constructed such that a graphics engine writes an object image to a series of tiles, which may subsequently be assembled for serial output to drive a monitor. The graphics engine renders complete, unclipped objects into the tiles. Thus, allocated tiles are associated with an object image representing not only the contents of the current display, but also pixel data which may be displayed at some time in the future. Data from the view position sensing apparatus is used to select and appropriately order the tiles for display relative to the current viewing position; other pre-display processing is performed at that time. The display of data according to the present invention may be on an autoscopic display such as a standard computer monitor. Alternatively, the display may be by a stereoscopic display such as shutter glasses worn by the user.

BRIEF DESCRIPTION OF THE DRAWINGS

The present invention will be described in greater detail below, including specific examples thereof, with regard to the figures, in which:

FIGS. 2A and 2B illustrate the parallax effect; that is, the apparent relative motion of two objects in response to motion of the viewer.

As between each of these figures, like reference numerals shall denote like elements.

DETAILED DESCRIPTION

The present invention will now be described through the detailing of several embodiments for producing a parallax display effect. The order of the embodiments is intended to be indicative of performance of the embodiment and the need for alteration of known computer graphics systems, from lowest performance and least alteration to highest performance and most alteration. However, the nature of the system within which the present invention is employed will determine the extent of the modification required thereto, and ultimately the performance of the system with the present invention.

Figure 1A:
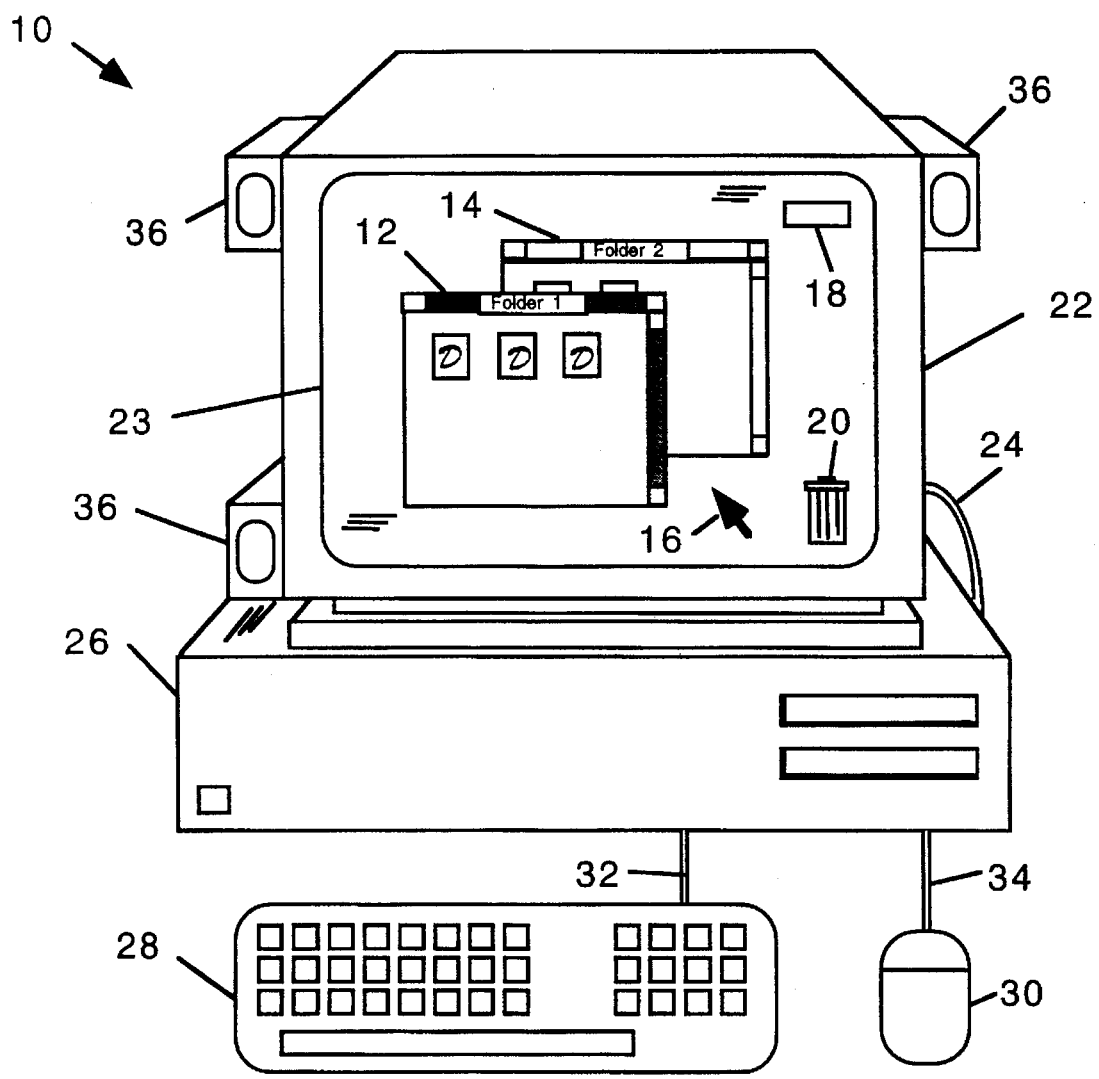
FIG. 1A is an illustration of a desk-top computer system.

In accordance with the description of each of these embodiments, FIG. 1A is an illustration of a desk-top computer system 10, displaying several objects, such as windows 12 and 14, a cursor 16, and icons 18 and 20, on a display monitor 22. As well known, display monitor 22 is connected by means 24 to computer 26 in a manner to permit electrical communication therebetween. Also connected for electrical communication to computer 26 is keyboard 28 and a cursor control device (e.g., a "mouse") 30 by means 32 and 34, respectively. User view position sensing apparatus 36 (such as an ultrasonic transmitter and receiver) is connected to computer 26 as a required additional input apparatus. Other peripheral devices may also be connected to computer 26.

Figure 1B:
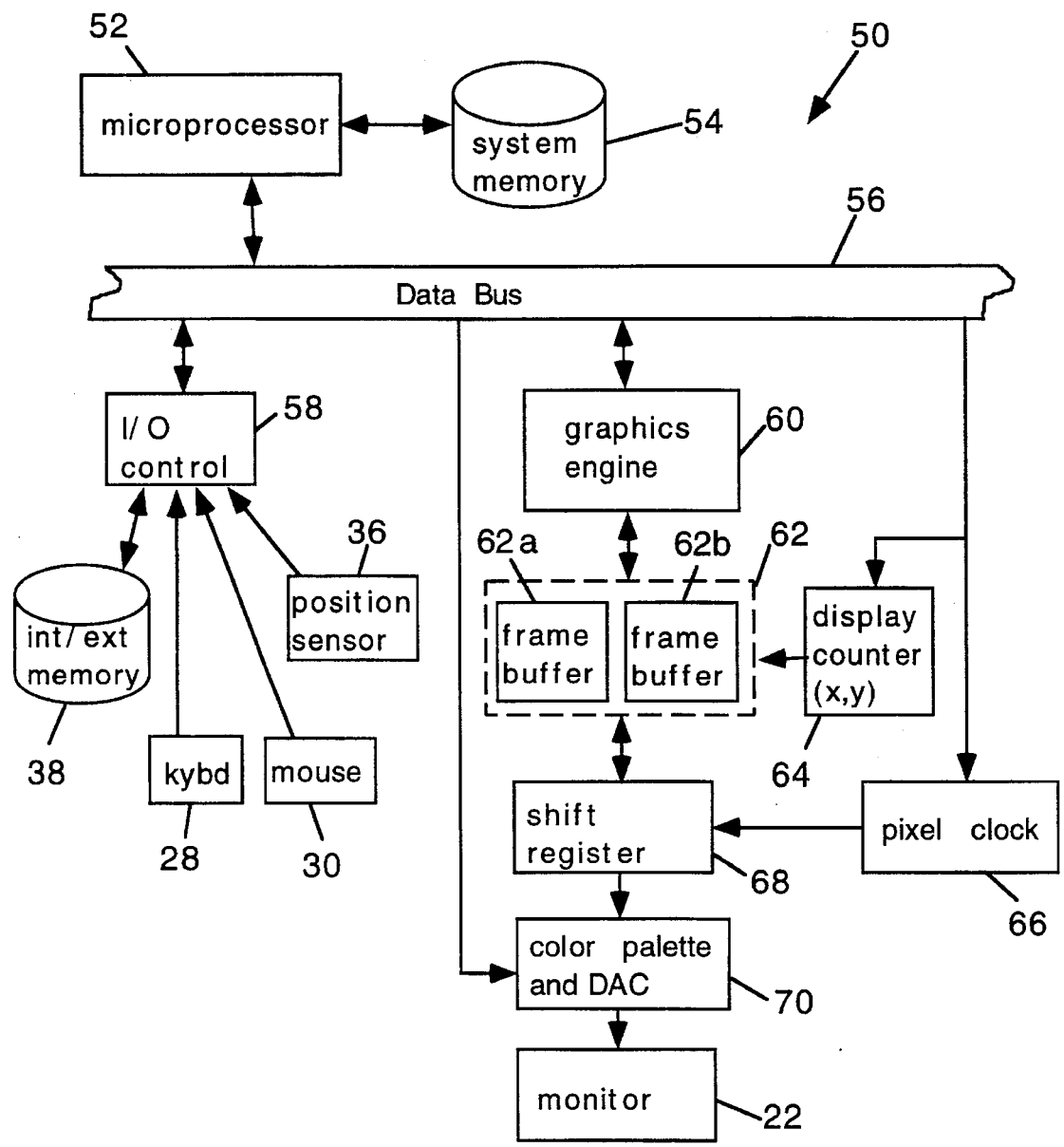
FIG. 1B is an illustration of the basic system configuration, or architecture, of the computer system shown in FIG. 1A.

FIG. 1B is an illustration of the basic system configuration 50 of computer 26. Such a system is typical of graphics configurations found in most desk-top computers and graphics workstations today. The system configuration 50 includes a microprocessor 52 connected for two-way communication with system memory (e.g., random access memory) 54 and data bus 56. Also connected to data bus 56 is an input/output (I/O) control interface 58 for moderating communication between keyboard 28, cursor control 30, view position sensing apparatus 36, and internal/external memory 38 on the one hand, and microprocessor 52 on the other hand. Also connected to data bus 56 is graphics engine 60, which is connected in series with a frame buffer 62 (optionally, of the type permitting double buffering as discussed further below), shift register 68, color palette 70, and monitor 22. Color palette and DAC (digital-to-analog converter) 70 is also connected to data bus 56 via display counters (x,y) 64, and pixel clock 66 to permit communication with microprocessor 52. As well known, frame buffer 62 is a display address bit map, to which each pixel address may be individually written, and from which each pixel address may be serially read ("rasterized") to generate a display.

First Embodiment—Standard Graphics Engine, Double Buffering

This first described embodiment is intended to produce the parallax effect in the display of multiple objects utilizing primarily hardware and software found in common high performance desk top computers and graphics workstations. With reference to FIG. 1B, frame buffer 62 comprises two separately addressable frame buffer units 62a, 62b. This embodiment utilizes double buffering for graphics memory management. According to this well known technique, a first buffer, which is essentially a display map, is being read out for display, while the second buffer is being written to for subsequent display.

Assume for the purposes of the present explanation that two objects are to be displayed. Parallax perspective depends on the first object being closer to the viewer than the second object. The closer object shall be referred to herein as the "front object" 80, and the object farther away shall be referred to herein as the "back object" 82 (shown in FIGS. 2A and 2B). While two objects are shown and referred to for illustration purposes, the same principles and procedures, by iteration, apply directly to the display of more than two objects as contemplated by the present invention. Furthermore, for illustration it will be assumed that the two objects 80 and 82 are rectangular, planar, non-intersecting "windows" of the type generated by and displayed under the control of a windows manager portion of a computer operating system, although the present embodiment is extendible to non-windows objects.

According to the present embodiment, the contents of the first frame buffer unit 62a is built using an appropriate hidden surface removal process. For example, the so-called "painter's algorithm" may be used, and is described in pertinent detail herein. The microprocessor 52 first determines which of the objects is the front object 80 and which is the back object 82. For example, an active window may be defined as the front object and a nonactive window as the back object. Once this is known, the microprocessor 52 passes graphics instructions—namely, primitives and coordinates—of the back object 82 to the graphics engine 60, which draws the back object 82 into the first frame buffer unit 62a. For the purposes of the present explanation, a primitive is defined as a graphics instruction which, when executed by the graphics engine, results in an expected arrangement of pixels rendered into the frame buffer or related image memory. The primitive graphic instruction is composed of the primitive type, the coordinates of the primitive, and any other parameters specific to the primitive type that are needed to render it. Primitive types include lines, circles, arcs, text, filled rectangles, and the like.

Next, microprocessor 52 passes primitives and coordinates of the front object 80 to the graphics engine 60, which draws the front object 80 into the first frame buffer unit 62a in such a manner that only the pixels of the back object 82 which are blocked from view (occluded) by pixels of the front object 80 are overdrawn. The composed contents of frame buffer unit 62a may then be displayed by monitor 22 as well known in the art. Other well known hidden surface removal techniques for building the contents of the frame buffer unit 62a may be used, such as window clipping, etc.

The contents of frame buffer unit 62a is now ready to be displayed on monitor 22, and accordingly, at this point in time the first frame buffer is referred to as the "visible" frame buffer. A display refresh cycle begins, and the frame buffer is read out line by line from shift register 68, and converted into display data by color palette and DAC (digital-to-analog converter) 70. The display of the contents of the visible frame buffer unit 62a then shows the front object 80 and those parts of the back object 82 not occluded by the front object. For example, the display of objects 80 and 82 on monitor 22 could appear to a viewer v, located at position p, roughly as shown in FIG. 2A.

Assume next that the position of viewer v has shifted from the viewing position p shown in FIG. 2A to a position p' shifted with respect to monitor 22, as shown in FIG. 2B. View position sensing apparatus 36, together with associated software, will determine the extent of the shift in the viewer's position, namely the distance in two dimensions from p to p'. For purposes of the present description, the viewing position shall be considered to be a discrete point in space (e.g., p, p'). While a user's stereoscopic view depends upon having two spaced-apart eyes, the spacing between the user's eyes is relatively small as compared to the distance between the user's eyes and the monitor 22. Therefore, it does not take away from the operation of the present invention to assume that the discrete viewing position (p, p') is the midpoint between the user's eyes.

It is important to understand that in this embodiment, the calculated positional shift from p to p' takes into account horizontal motion of the viewer in the plane of monitor 22, referred to as motion in the x-axis, and vertical motion of the viewer in the plane of monitor 22, referred to as motion in the y-axis, but does not take into account motion of the viewer toward or away from the monitor 22, referred to as motion in the z-axis. Motion in the z-axis effects zooming in or out on displayed objects, which is discussed in further detail below. This embodiment does not employ z-axis viewing position tracking, and thus does not provide for zoom. Unless otherwise stated, a described embodiment will not provide zoom (as discussed below, however, zoom may be added to any embodiment described herein as appropriate for the specific application of the present invention).

In this embodiment, and certain other embodiments described below, the z-dimension of the front and/or back objects may be defined by the user in an on-screen control panel setting or through user actions with mouse 30. Furthermore, the spacing between objects along the z-axis may also be controlled by way of a control panel setting, especially when the number of objects is greater than two. This spacing may be uniform, or in certain applications, may taper off as the objects are visually located progressively "farther" from the viewer.

Next, to understand what positional effect the shift in viewing position has on the display of objects 80 and 82, it is necessary to specify a policy or rule governing the position and relative motion of the objects.

There are three possible policies which can be established, each in appropriate applications, with regard to the relative motion of the objects. According to the first policy, each object is at a depth (z-axis position) into the display between the display screen and a vanishing point, so that as the position of viewer changes, each object moves as a function of its depth into the display. This is the most general case, and will be the assumed case for the discussions herein.

A second policy could be established, however, that the front-most object stays fixed in response to a shift in the viewer's position, and all other objects move relative to the fixed front object. A third policy can also be established that the rear-most object is fixed in space, and that all other objects move relative to it in response to a shift in the viewer's position. Each of these second and third policies are special cases of the more general first policy, and may be routinely derived from the description employing the first policy below.

Processing proceeds as follows. Microprocessor 52 stores a list of regions of windows and their coordinates. For example, all of front window 80 would be treated as a first region A. A horizontal line established by the bisection of the back object 82 by a line drawn along the top of front object 80 is used by the window manager portion of the operating system (or high level application program) to divide back object 82 into two regions, the first being the extent of back object 82 above said line as region B, and the second below said line and bounded by the right margin of front object 80 as region C. Regions B and C of back object 82 are copied into second frame buffer unit 62b, and an expose event is generated to cause the rendering of a new region D, which is that part of back object 82 previously occluded by front object 80, into the second frame buffer unit 62b. An expose event is defined as an operating system-generated event in which the window manager notifies one or more applications that some portion of the application's window which was previously obscured is now exposed. An expose event is similarly defined within a single application as an event in which that portion of an object which becomes visible to the viewer through an action that is determined outside of the application's domain. The response of an application to expose events is to generate a set of graphics primitives that are sent to graphics engine 60 for rendering the exposed portion of the window or object.

Figure 2C:
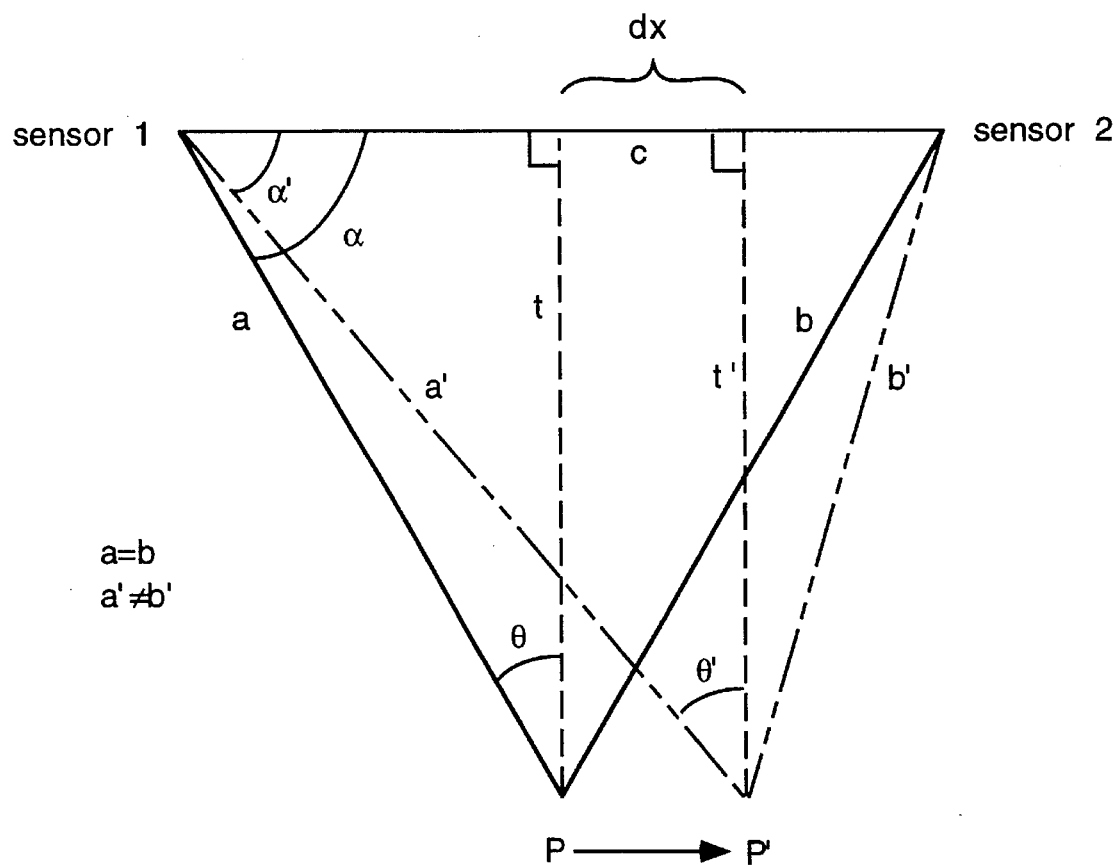
FIG. 2C is an illustration of the method for calculating viewing position according to the present invention.

The microprocessor 52 then determines the new coordinates of front object 80, and draws front object 80 into second frame buffer unit 62b in its new coordinates in the same way it was drawn into first frame buffer unit 62a. With reference to FIG. 2C, an example of the calculation of the change in viewing position is as follows:

$\alpha = \cos^{-1}[(b^2 + c^2 - a^2)/2bc]$ and $\alpha' = \cos^{-1}[(b'^2 + c^2 - a'^2)/2b'c]$   law of cosines $t = a \sin\alpha$ and $t' = a' \sin\alpha'$   law of sines $\theta = 90 - \alpha$ and $\theta' = 90 - \alpha'$   sum of angles $x = a \sin\theta$ and $x = a \sin\theta$   law of sines $dX = x' - x$   change in X position of viewer Similar equations apply for determining the change in y-position. Finally, an example of the equation used to determine the new coordinates is the following:

$$X' = \left[ \frac{z}{z+t} \right] dx + x_{norm}$$

and $$Y' = \left[ \frac{z}{z+t} \right] dy + y_{norm} \text{ where}$$

dx and dy are the change in x-and y-positions, respectively, of the viewer

X" and Y" are the new x and y coordinates, respectively z is the distance between the viewing position and the plane in which the viewed object is located t is the distance between the viewing position and the plane of the display screen $x_{norm}$ and $Y_{norm}$ are the x-and y-positions of the viewer normal to the display screen. Referring to FIG. 2C, $x_{norm}$ and $Y_{norm}$ are defined as a coordinate along the line where a=b or otherwise defined by the user.

Figure 9:
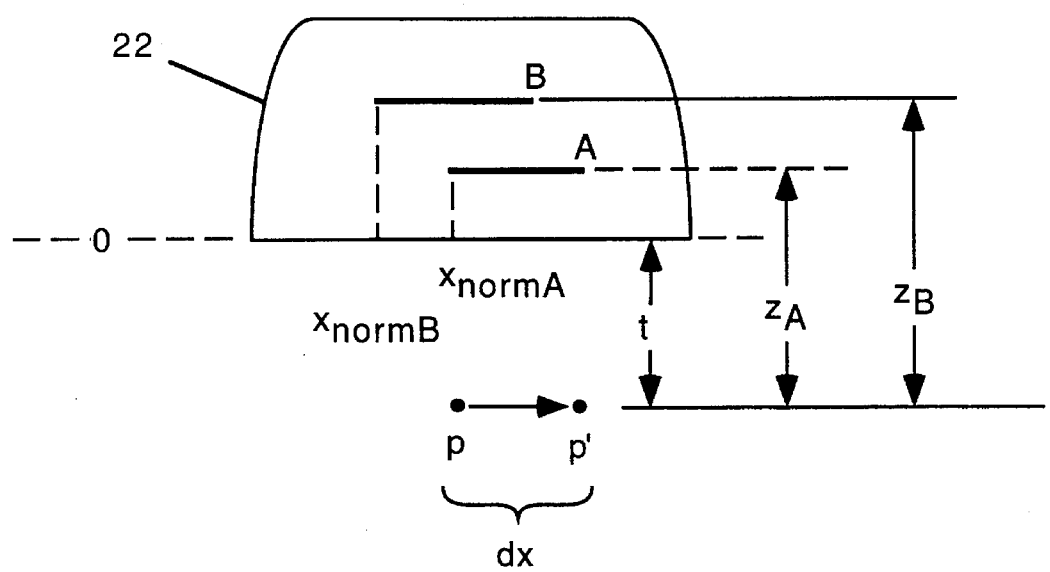
FIG. 9 is an illustration of the method for calculating object coordinates according to the present invention.

Referring to FIG. 9, two windows are shown, A and B, viewer positions, p and p', and dx, the change in X between the viewer positions. Also shown are the distances measured along Z of t, $Z_A$ and $Z_B$ from viewer to display, viewer to object A, and viewer to object B, respectively.

The contents of frame buffer unit 62b is now ready to be displayed on monitor 22. Accordingly, at the start of the next display refresh cycle the second frame buffer becomes the "visible" frame buffer, and the first frame buffer unit 62a simultaneously becomes the non-visible frame buffer. The frame buffer is read out for display as described above, with the display of objects 80 and 82 on monitor 22 appearing for example to viewer v, located at position p', roughly as shown in FIG. 2B. This general process is continuously repeated in order to display objects 80 and 82 relative to one another as a function of the position of viewer v.

Figure 3:
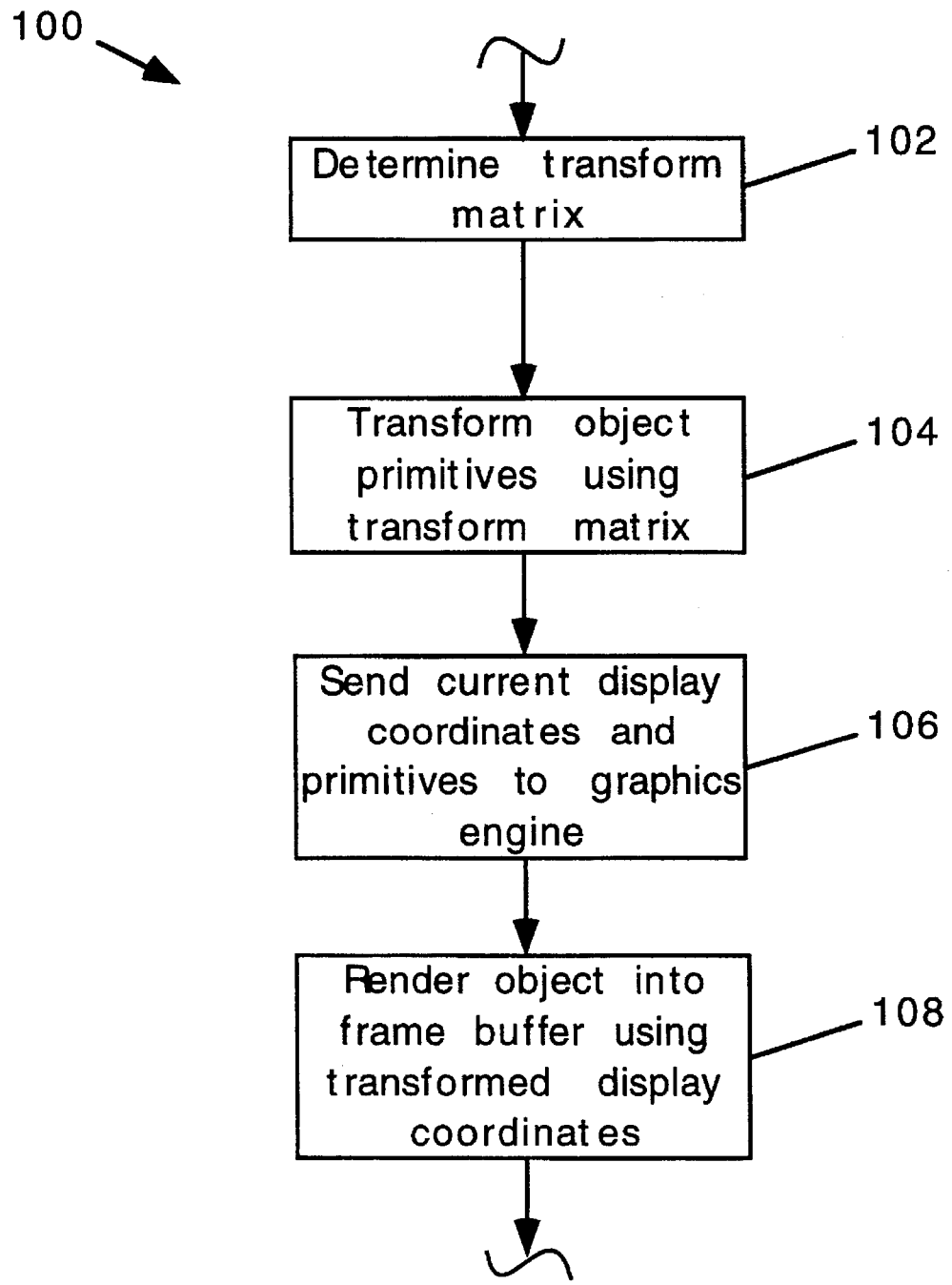
FIG. 3 is a flow chart showing the steps of the process of writing data representing a graphic object into a frame buffer for subsequent display.

Summarizing, FIG. 3 is a flow chart showing the steps of the process 100 of writing data representing a graphic object into a frame buffer for subsequent display. At step 102, the transform matrix for the current display is determined. At step 104, the coordinate-based graphic primitives of that object are transformed using the transform matrix. At step 106, the transformed graphic primitives are sent to the graphics engine with the display coordinates. Finally, at step 108, the graphics engine uses the display coordinates as a frame buffer address to render the image pixel data of the graphic object into the frame buffer.

The use of the two frame buffers 62a, 62b in this embodiment serves an important function. In a single buffer computer systems, if a viewer were to shift viewing positions in the middle of a frame display refresh, part of the display would be from the original viewing position, and part of the display would be from the shifted viewing position. This disturbing visual effect is referred to as "tearing." The two-buffer system according to this embodiment provides a staging mechanism for the display data to prevent tearing.

The use of two frame buffers in this embodiment provides the added benefit that any pixel data of an object currently displayed that will also be visible from the shifted view angle can be copied over into the non-visible display without the additional processing requirements of regenerating the entire pixel data for the objects.

A variation on this embodiment, also employing two frame buffers, operates in substantially the same way, but rather than copying and redrawing the objects, the objects are fully redrawn prior to each display refresh cycle. For example, after first frame buffer unit 62a is written to according to the above description, and being displayed as the visible frame buffer, second frame buffer unit 62b is written to in identically the same way. Rather than copying portions of back object 82, front object 80, and drawing by way of an expose event, back object 82 is redrawn completely. Front object 80 is then drawn into second frame buffer unit 62b, overwriting back object data where appropriate. This variation requires a high speed graphics processor, and thus is not as generally applicable as the previously described version of this embodiment. However, in appropriate systems, it is possible to provide both variations of this embodiment simultaneously, and dynamically choose which to employ based, for example, on a determination of the complexity and time for a complete redraw, etc.

Second Embodiment—High Speed Graphics Engine; Single Buffer

The next embodiment described herein departs from the two frame buffer approach described above. Rather than double-buffering the bitmaps and maintaining the graphics objects as pixel-based objects in those bitmaps, in this embodiment the graphic objects are maintained as a complete set of graphics primitives. Using position information from the view position sensing apparatus, this set is mathematically transformed from one display view to the next. Transformation algorithms are well known, and there are a variety of such algorithms from which to choose. One example is the planar geometric projection described by J. D. Foley et al. in *Computer Graphics: Principles and Practices*, p. 267 et seq. (2nd ed., Addison-Wesley, 1990). Another example is described by Blinn in "A Trip Down the Graphics Pipeline: The Homogeneous Perspective Transform", in *IEEE Computer Graphics & Applications*, May 1993, p. 75 et seq. The parallax effect on objects being displayed is enhanced by using perspective transformation in determining each object's displacement as a result of the viewer's head movement. However, perspective projection of the objects onto the view plane, which is the mathematical equivalent of the plane of the monitor, is not necessary in many cases. Therefore, the objects may be projected using the simpler parallel projection.

Once transformed, the visible primitives are sorted from the non-visible ones. This is typically accomplished via a clipping algorithm which is well known.

Finally, the primitives are sent to the graphics engine 60 to be converted into pixel data, and the pixel data is written into the frame buffer for display. In this embodiment, the graphics engine 60 is fast enough to render the image in real-time so that portions of images already rendered need not be recovered (as would be otherwise required in a system employing a slow processor) from one frame to the next. For this embodiment to be practical, it is estimated that the peak "bitblt" performance of the graphics engine 60 must be about an order of magnitude greater than the rate of pixel display.

As in the prior embodiments, the first step is to determine the relative positions (front and back) of the two overlapping objects 80 and 82. Once this is accomplished, microprocessor 52 transforms and clips the coordinate data of the primitives, and then passes the transformed and clipped primitives of the back object to the graphics engine 60, which draws the back object into the frame buffer 62. Next, the microprocessor transforms and clips the primitives' coordinate data of the front object, and then passes the primitives of the front object to the graphics engine 60, which draws the front object into the frame buffer 62 in such a manner that only the pixels of the back object which are occluded by pixels of the front object are overdrawn. The composed contents of frame buffer 62 may then be displayed by monitor 22 as described above.

Assuming that the position of the viewer has changed from p to p' (FIG. 2B), resulting in a parallax shift of the relative positions of the front and back objects 80 and 82, the view position sensing apparatus 36 and associated software will determine the extent of the viewing position shift from p to p'. Since, in this embodiment, the system is fast enough to allow the graphics engine 60 to complete its writing to the frame buffer 62 between display refresh cycles, the following process takes place after the conclusion of a display refresh using the contents of the frame buffer 62, but before the start of the next display refresh. The new position of the back object is calculated based on the data from the view position sensing apparatus 36 and associated software, and the new coordinates of the back object are transformed and clipped and sent to graphics engine 60 to be rendered. The new position of the front object is calculated based on the data from the view position sensing apparatus 36 and associated software, and the new coordinates of the front object are transformed and sent to graphics engine 60 to be rendered.

The writing of the objects into frame buffer 62 can then proceed, starting with the writing of the back object's new coordinates and/or primitives, and concluding with the writing of the front object's coordinates and primitives. The composed contents of frame buffer 62 may then be displayed on monitor 22. The process of calculating the new coordinates and/or primitives is continuously repeated.

Third Embodiment—Parallax Engine Using Compositing Techniques And Fully Rendered Objects The third embodiment described herein differs from the previously described embodiments in several respects. First, the hardware employed differs from that of a standard workstation graphics processor, as described further below. Second, each memory location for pixel data will not necessarily have a one-to-one correspondence to a pixel on the display. Third, the system stores pixel data in units referred to herein as tiles, representing not only the contents of the current display, but also pixel data which may be displayed at some time in the future. Fourth, rather than simply reading out the ordered contents of a buffer for display, generating the current display involves selecting, ordering, and assembling tiles, much like the building of a jig-saw puzzle, so that the assembled tiles may be read out to generate the desired display.

Architecture

Figure 4:
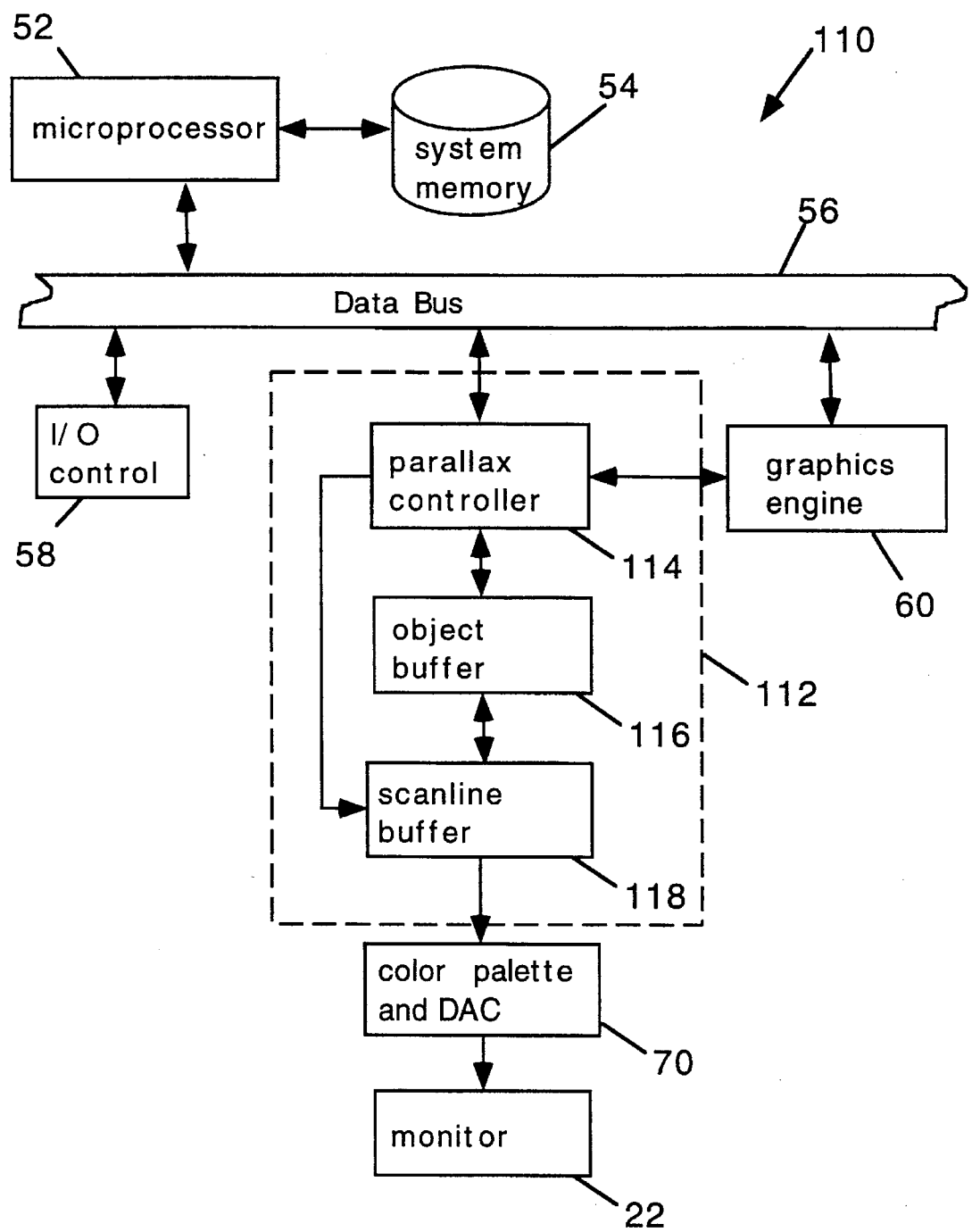
FIG. 4 is a partial view of a computer architecture showing the components of one embodiment of a parallax engine according to the present invention.

The computer architecture 110 employed in this embodiment is a deviation from the more conventional computer architecture described and referred to above. Specifically, with regard to FIG. 4, a parallax engine 112 consisting, inter alia, of elements referred to herein as a parallax controller 114, an object buffer 116, and a scanline buffer 118, is interposed between the graphics engine 60 and the color palette 70. Initially, the structure and interconnection of this architecture 110 shall be described, followed by a description of the process of its operation.

Figure 5:
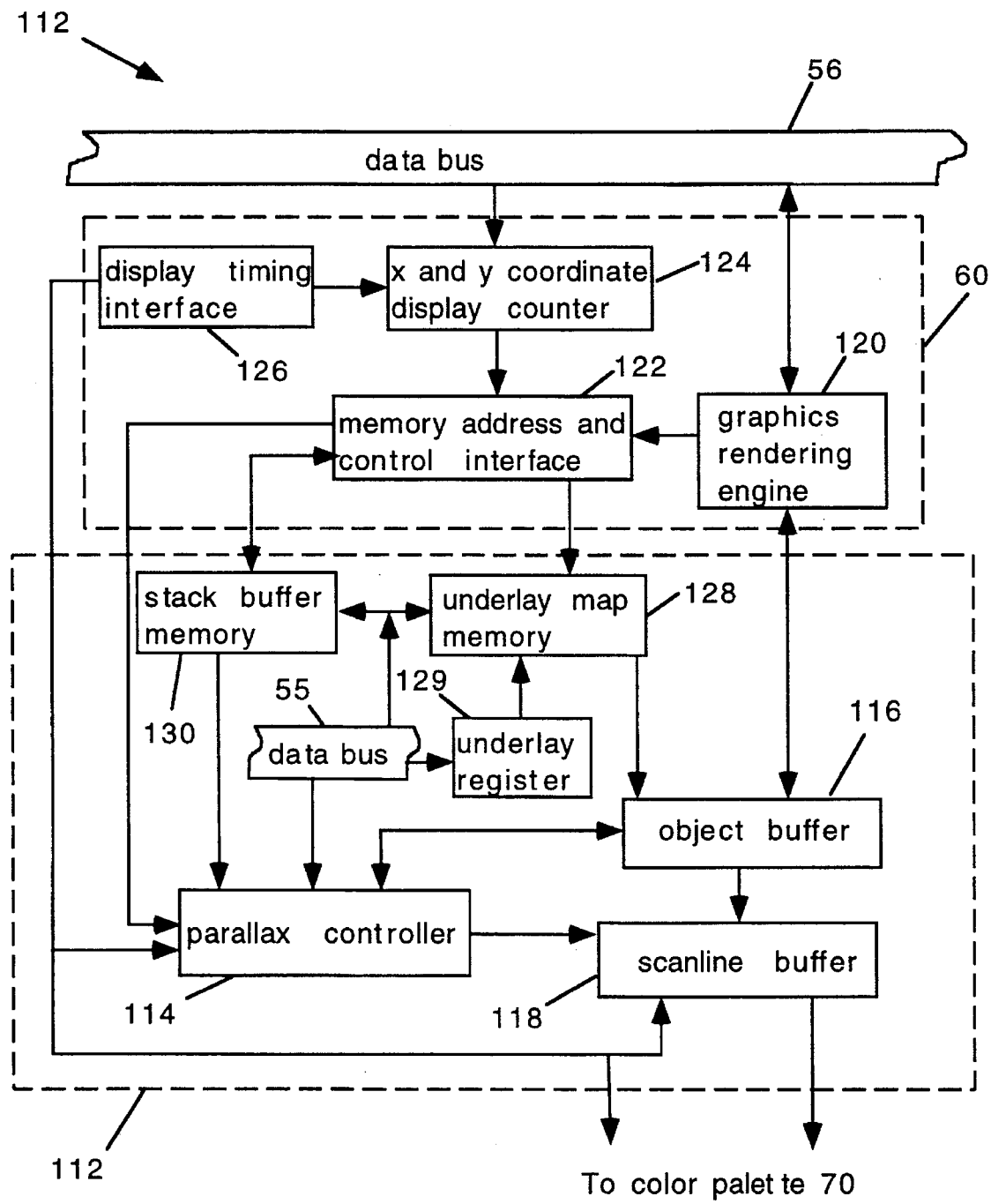
FIG. 5 is a more detailed illustration of the components and interconnections of a graphics engine and parallax engine according to one embodiment of the present invention.

Referring to FIG. 5, the components and interconnections of graphics engine 60 and parallax engine 112 are shown in detail. Graphics engine 60, including graphics rendering engine 120, memory address and control interface 122, x- and y-coordinate display counter 124, and display timing interface 126, receives graphics primitives, display coordinate data, and display commands from system bus 56. Graphics engine 60 renders pixel data into object buffer 116.

A buffer which is referred to herein as object buffer 116 replaces the frame buffer 62 previously described. Object buffer 116 is essentially an oversized frame buffer. Object buffer 116 differs from the frame buffer 62, however, in that object buffer 116 is not composed of an ordered set of pixels to be sequentially read out for display refresh. Rather, it is a pool of allocable, individually addressable groupings of memory referred to herein as "tiles" in which any tile or portion of a tile may be displayed at any location of the display.

This means that the contents of object buffer 116 is not simply serially read-out for display refresh, but rather a display table is assembled containing reference to various of the tiles comprising object buffer 116, and this table is stepped through to compose the contents of the display. Stack buffer memory 130 stores this table of ordered addresses for display under control of the parallax controller 114.

Underlay map memory 128 receives rendering address data from memory address and control interface 122 to map the graphics engine's memory access to the object buffer 116. Underlay map memory 128 is, in one embodiment, high-speed static random access memory (SRAM). Parallax Controller 114 receives the control data from memory address and control interface 122 to generate object buffer 116 control during rendering and display of pixel data.

Using control data from display timing interface 126, parallax controller 114 retrieves from stack buffer memory 130 tile addresses of object buffer 116 for display. Display data from object buffer 116 is then loaded into scanline buffer 118. Scanline buffer 118 replaces shift register 68 previously described in the first and second embodiments. Scanline buffer 118 differs from shift register 68 in that its input port has random access capability. Under control of parallax controller 114, data is transferred to color palette 70 for conversion into a suitable signal for the monitor.

Object buffer 116 further differs from frame buffer 62 in size. In a typical embodiment, object buffer 116 will be a matrix 4 Kbytes wide by 4 Kbytes tall, meaning it is 16 times larger than a typical 1 Kbyte-by-1 Kbyte frame buffer. (Although if large enough to provide the functions required of it, actual size of object buffer 116 is relatively arbitrary.) In fact, as will be evident from the discussion below, it is convenient to think of the object buffer 116 as a pool of allocable tiles which are mapped onto multiple separately addressable frame buffers. The purpose for providing the large object buffer 116 is to allow for mapping to regions which extend beyond the limits of the monitor's physical boundaries, and to map portions of objects occluded by other objects.

Since typical graphics engines are equipped to address only 1–4 Mbyte frame buffers, such an engine's addressing scheme alone cannot support full addressing of object buffer 116. Underlay map memory 128 is a look-up table providing assigned underlay levels (as described below) to tiles to provide a means for addressing the entirety of object buffer 116 and to provide a means for efficiently accessing non-contiguous tiles from a two-dimensional memory array and mapping them onto a contiguously addressed plane in a three dimensional space. In one sense, the underlay map is a writable address translator, translating two-dimensional memory addresses into a three dimensional display space.

The process of displaying the images of objects according to this embodiment consists of essentially two distinct tasks: rendering the objects into memory (by definition, a writing process), and generating a display of the objects based on ordering the contents of the memory (by definition, a reading-out process). Each process is described below.

Operation—Rendering

Figure 6:
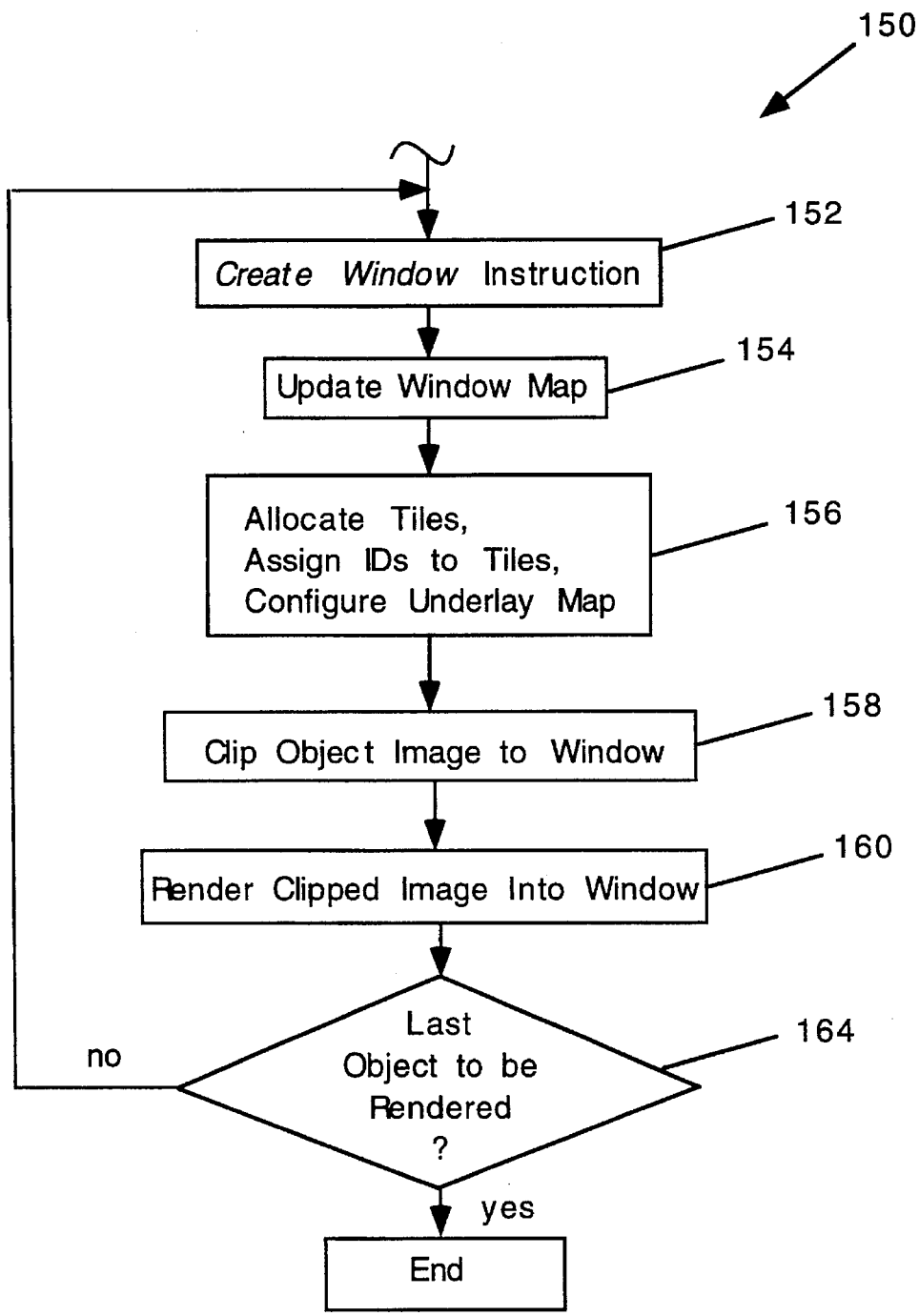
FIG. 6 is an example of the steps involved in the process of rendering an object into memory according to the present invention.

A simple example of the steps involved in the process 150 of rendering an object into memory is shown in FIG. 6. Initially, we start with the assumption that an application program or operating system is to display a window. In typical windowing systems, this is accomplished by the application program or operating system passing a create window instruction or more generally an object instantiation instruction to the window manager portion of the operating system or separate application program, followed by a passing of the graphics primitives enabling the graphics engine to render the object into appropriate memory. The create window instruction is shown at step 152.

According to the present embodiment, a parsing routine (driver) intercepts the create window instruction 152. Typically, the create window instruction includes data about the size of the window to be created, the location at which the window is to be displayed, and a unique window identification ("window id"). The parsing routine uses this data to update a window map at step 154, described as follows.

Window Map

The Window Map uses the data from the create window instruction 152 and builds a data structure array to provide information about where the window is to be displayed on the monitor 22 (referred to as "device coordinates") and about tile mapping to the object buffer 116 for each window id. This data structure array reflects the actual layout of windows in the viewable portion of the memory (referred to as the "view volume") as well as the way the windows are physically mapped into object buffer 116. An example data structure in C is as follows (all data structures provided herein are assumed to be in the C programming language, although they may be adapted to other programming languages as well known in the art):

```
struct window {
      int window_id;          // unique ID for each windowint
      xorg,yorg,zorg;         // 3-D origin of window
      int x-extent,y-extent;  // x and y dimensions of
                              // window in device +
                              // coordinates.
      rect *visible;          // list of mapped or potentially
                              // visible rectangular regions
                              // of window.
      rect *occluded;         // list of unmapped rectangular
                              // regions of window.
} window_map[MAX_NO_WINDOWS];
struct rect {                 // rectangular region data
                              // structure.
      rect *next_region;      // null if no more regions;
      int  xorg, yorg, x_extent, y_extent;
      int  underlay_level;    // underlay level into which
                              // rectangle is mapped
} window_regions[MAX_NO_OF_RECTANGLES];
```

Each window (or, generally, each object) is stored as a collection of uniformly sized 2-dimensional tiles, each tile carrying a small piece of the object (each tile is simply a dedicated unit of memory, and the object buffer is the collection of all such tiles). Thus, it is necessary to determine the number of tiles needed to represent the entire object. This is accomplished by dividing the window width (known from the data associated with the create window instruction) by the tile width (defined by a parsing routine described further below), rounding up as necessary, the window height by the tile height, again rounding up as necessary, then multiplying these two results together. Rounding up insures that enough tiles are allocated to render all of the object.

Tile Allocation Table

As tiles are allocated to a window (step 156), as discussed below, a data structure referred to as the tile allocation table is used to allocate and deallocate tiles. A standard memory allocation routine, as is well-known in the art, manages the tile allocation table. The window id is used to identify the tiles allocated from the tile allocation table and to index another data structure referred to as the tile map.

Tile Map

As tiles are allocated, the tile map is constructed by the parsing routine to keep track of the particular tiles assigned to a window and the underlay level assigned to the tiles that compose the window. As well, the parsing routine assigns each newly allocated tile with a unique identification ("tile id") corresponding to the tile's physical memory address in the object buffer. This allocation and assignment, shown at step 156, is used to configure the underlay map for the tiles composing the window. Thus, each allocated tile has associated with it in the tile map: a tile id, an underlay level assignment, and a window id. More detail of the underlay assignment is provided below.

Each tile in the collection of tiles allocated to a window will contain a portion of that window. The generally non-contiguous collection of tiles are mapped by the underlay map (see below) to appear to the graphics engine as a contiguous 2 dimensional region of memory.

Underlay Register

Before an application program can pass its graphics primitives to graphics engine 60 for rendering its window, the parsing routine must first set the underlay level in underlay register 129. The parsing routine reads the underlay level from the tile map by using the window id which is associated with the graphics primitives from the application program. To set the level in the underlay map before rendering into a window, the following assignment is made to underlay register 129:

underlay_level=window_map [window_id]. visible ->underlay

By setting the assigned underlay level and by maintaining the underlay map as tiles are allocated from the object buffer 116, device coordinates for the primitives may be used from the application program without additional transformation.

Next, the primitives are clipped (step 158) to the current window's boundaries if the application program has not done so. Then primitives are sent to graphics engine 60 for rendering as shown in step 160 of FIG. 6, rendering the entire object to the collection of the allocated tiles. This process of intercepting graphics commands, allocating tiles, and rendering the entire window into tiles continues for each window at step 164 until all windows to be displayed are rendered into object buffer 116.

A critical distinction of this embodiment over the prior art and previously described embodiments is that, whether or not all or part of a window is occluded by another window on the monitor, the entirety of each window comprising the display is rendered by the graphics engine, into the tiles reserved for that window. While applying a window clip list to the window's primitives would follow window creation in rendering to a typical frame buffer for display, according to the present embodiment, clipping occluded portions of a window is bypassed. The process of excluding occluded portions of a window from view is reserved for the process of selecting tiles in the display generation part of the process.

Underlay Level Assignment

As previously discussed, at the time of instantiation of an object or window, the parsing routine is allocated the necessary tiles from the tile allocation table. It is at this time that the object is assigned an underlay level. The underlay mechanism is now described in detail.

The set of underlays may be thought of as a set of virtual frame buffers, each parallel to the other in the X-Y plane, and each further back in the Z direction from the previous one. The size of an underlay is defined to span the X-Y extent of the view volume (the volume of viewable space) at its assigned Z coordinate.

Unlike conventional frame buffers, an underlay has no memory assigned to it except those tiles included in its windows. In general, there are more underlays than tiles in object buffer 116 to completely fill them. This allows all of a window's tiles to be assigned to only one level. By having only a single level for the entire window, the underlay level of underlay register 129 need only be set once before rendering a window. Therefore, clipping is not required within the extent of the window, resulting in optimum performance.

There are a number of ways to assign underlay levels to objects such that the tiles of an entire object are encompassed on a single underlay. The preferred method is by applying a concept referred to herein as spatial coherency. Spatial coherency states that one and only one object or window can occupy a given coordinate in space.

By applying the concept of spatial coherency to underlay level assignment, if two objects exist on the same X-Y plane (i.e. the same underlay), then they cannot both occupy the same X-Y coordinate. Only one object is visible at a shared coordinate regardless of the viewer's position. Because both objects are at the same Z coordinate, there will be no parallax effect between the two objects regardless of the overlap. Therefore, there is no reduction in spatial fidelity.

Application of spatial coherency implies that there are as many assigned underlay levels as there are unique Z coordinates for rendered objects. It also implies that as long as the number of unique Z coordinates in use does not exceed the capacity of the underlay map, then it will always be possible to render completely on a single underlay an object that obeys spatial coherency.

In general, each object will be completely rendered into a single underlay, however, there are three cases in which the object is not completely rendered. The first case occurs when spatial coherency to underlay assignment is applied and two or more objects overlap at the same (x,y,z) coordinate. This case reflects conventional windowing systems in which there is only one Z value and the last object rendered is the one that occupies a shared coordinate. The second case occurs when the object's coordinates place it partially outside of the underlay's extent. The third case occurs when the parsing routine cannot be allocated enough tiles or an underlay with enough unused tile spaces to instantiate a new object. In this case, the parsing routine provides a mechanism for graceful degradation of the parallax effect. This mechanism is referred to herein as paste-up.

Paste-up is defined here as a mechanism that recovers tiles from the obscured portions of objects that exhibit the least amount of parallax. For example, if a parallax policy is used in which the objects furthest away from the view are fixed with respect to the viewer, then the objects in the underlay just in front of the furthest underlay are copied on top of the objects in the furthest underlay, preserving (x,y) positions as defined by direct (normal) viewing (illustrated as position p in FIG. 2A). Then the tiles and the underlay level allocated in the closer underlay are de-allocated and returned to the tile allocation table and tile map to be used for new object instantiations.

Those obscured portions of objects in the furthest back underlay no longer exist in object buffer memory 116. Only when these objects are moved under program or user control do the obscured portions need to be rendered. Conventional mechanisms are applied such as expose events (previously discussed).

Underlay Map

Underlay map 128 serves three functions in this embodiment. The first is to allow use of off-the-shelf graphics engines and memory. The addition of underlay map 128 provides an enhancement to the addressing mechanism of graphics rendering engine 120 allowing it to render to a buffer substantially larger than 1 Mbyte. The second function provides a means to allocate and deallocate tiles for use by graphics engine 60. The third function provides a simple tile mapping mechanism for efficiently accessing non-contiguous tiles from a two-dimensional memory array that are mapped onto a contiguously addressed plane in a three dimensional space.

In the third function of mapping tiles, underlay map 128 is used during both rendering and display operations. Addresses for rendering are received by underlay map 128 from memory address and control interface 122 and from underlay register 129 and remapped into the assigned tile address in object buffer 116. In the case of data display, addresses are received instead from stack buffer memory 130 for remapping.

As previously described, underlay map 128 is maintained by the parser routine to reflect the current state of windows or objects being rendered or displayed. This requires that the parser routine first update underlay map 128 for an object before rendering and display of the that object occurs. The tile mapping in underlay map 128 always reflects the corresponding data in the tile map.

In the preferred embodiment in which the object buffer is composed of a DRAM based memory (dynamic RAM), underlay map 128 remaps the source's row address for the DRAM in conjunction with the underlay level into a new row address for object buffer 116. In this embodiment, the tile id is object buffer 116 DRAM row address and the tile size is the number of columns in a bank of memory. The source address for the DRAM column bypasses underlay map 128 and goes directly to object buffer 116. The C programming language data structure for this embodiment of underlay map 128 is shown below:

struct level [DRAM_ROW_ADDRESS]{int tile_ras_
        adr;
    }underlay_map [NO_OF_LEVELS ]

The number of underlays is determined by design to encompass the maximum number of XY planes (along the Z axis) that are required to support the environment for which the parallax effect is to be applied.

Operation—Display Generation

Display generation involves identifying the proper tiles representing the visible portions of windows (utilizing information about viewing position), ordering and assembling those tiles (called video compositing), and sending those tiles in a proper fashion to proper display hardware. This is accomplished in two separate and distinct processes; building the data structures for stack buffer memory 130, and displaying image data in the selected tiles from object buffer 116 based on the data structures in stack buffer memory 130. This will be described in further detail after introduction of the additional elements used in these processes.

Stack Buffer

Stack buffer memory 130 is a special purpose memory providing the memory mapping information for video compositing. The stack buffer memory 130 is a double-buffered data structure in which one buffer is built during each display refresh interval while the other is read for display.

The stack buffer data structure is composed such that during display, the parallax controller 114 can correctly access object buffer 116 synchronous with the display timing. The format of the Stack Buffer is as follows:

section 1—video compositor display parameters section 2—buffer 0 display stack section 3—buffer 1 display stack At the start of every display refresh, display X and Y counters are loaded from section 1 (video compositor display parameters) of stack buffer memory 130 and maintained internally to parallax controller 114. These counters maintain synchronization with display timing interface 126 of graphics engine 60.

The display stack (section 2 or 3) is a data structure which is formatted to be read by parallax controller 114 and used to efficiently generate addresses of object buffer memory 116 and scanline buffer 118 control data during display refresh. The display stack is organized to map horizontal strips of tiles in object buffer 116 across the display.

The C data structure for the Stack Buffer may look like this:

```
struct xstripst{
    int     yheight;        // y-dimension of xstrip
    subdivision *xstrip_ptr;
} buffer0_display_stack[ NO_OF_STRIPS ];
struct subdivision {
    int     level;          // underlay level
    int     xstart;         // x window coordinate start
                            // position.
    int     ystart;         // y window coordinate start
                            // position.
    int     xlength;        // length of subdivision.
} xstrip [ NO_OF_SUBDIVISIONS ];
```

Scanline Buffer

This is a special purpose memory which is used to stage the image data read from object buffer 116 before presenting it to color palette and DAC 70. Scanline buffer 118 replaces shift register 68 of conventional graphics systems. Staging the data after object buffer 116 is required for two reasons.

The first reason is that color palette and DAC 70 requires precisely timed delivery of the image data. The object buffer read-out is not periodic and therefore unable to meet the delivery constraints. Therefore buffering is required by scanline buffer 118.

The second reason relates to the general case where objects are not rectangular but are irregular in shape. In this case, many pixels in a tile composing a portion of an irregular object are not used and therefore invalid for display. An invalid pixel is considered transparent. In such a case, it becomes necessary to read pixel data from object buffer 116 a second time for a particular display coordinate position. The pixel data read corresponds to the object immediately behind (using the current line-of-sight) the object with the transparent pixels. Therefore, staging the data for efficient read-out from object buffer 116 and accurately timed delivery to the display hardware requires scanline buffer 118. The preferred embodiment of scanline buffer 118 is the dual-port static RAM.

Stack Buffer Build Process

Figure 7:
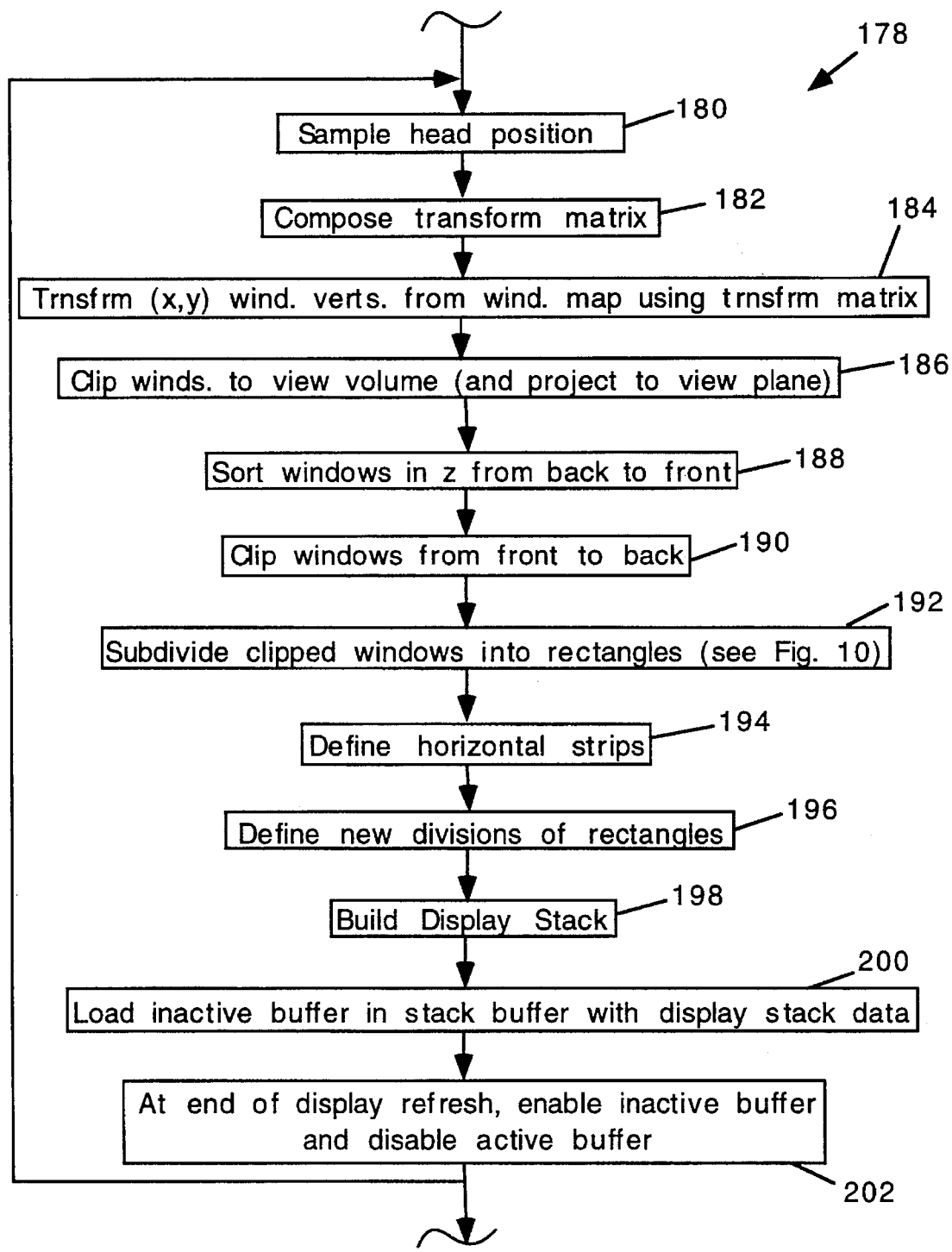
FIG. 7 is an illustration of the process of building a data structure representing three-dimensional position relationships between a sampled position of the viewer's head and displayed objects.

As described earlier, there are two separate and distinct processes required to properly display data from object buffer 116. The first of these processes is the stack buffer build process which is carried out by the parsing routine. This process is the building of a data structure that describes the display position and ordering of tiles selected from object buffer 116. The data structure which is built represents three-dimensional position relationships between the most recently sampled viewing position and the objects or windows as they might be perceived. Details of this process 178 are illustrated in FIG. 7.

The stack buffer build process is synchronized to the display so that a new display stack is built every display refresh period. This process begins with sampling the output from the head-tracking device at step 180. The sample is referenced to the display surface and a normal view position (position p in FIG. 2A). From the sample, a transform matrix is composed at step 182 as is done in the other embodiments. The matrix is applied as a coordinate transform to the entirety of window vertices in the window map at step 184. As with previous embodiments, the transformed vertices are clipped and mapped to the view plane, which is generally the surface of the monitor, at step 186. At this point, the coordinates of the window vertices or objects now reflect the relationship with the most recently sampled viewer position.

Figure 10:
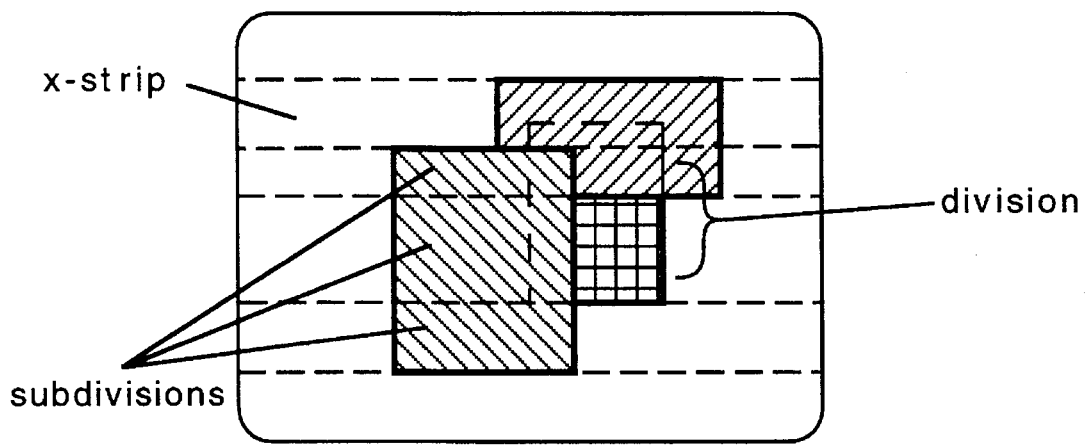
FIG. 10 show the divided regions of the display, illustrating the constructs of x-strip and subdivision.

Next, processed window data must be formatted for efficient read-out from object buffer 116 during display refresh. In general, displays are refreshed according to a raster scan pattern; this is reflected in the formatting. First the transformed windows are sorted in ascending order, from front to back, in Z at step 188. From this sort, the windows are fragmented into visible rectangular regions at steps 190 and 192. These regions are referred to herein as divisions. Horizontal strips are next defined, referred to herein as x-strips, by horizontally slicing across the full extent of the display coordinate range, using the top and bottom edges of every division, as shown at step 194. After defining these strips, all resulting rectangles are defined as subdivisions at step 196. An example of a formatted display according to the above is shown in FIG. 10.

Each subdivision is assigned to one and only one x-strip. Membership to an x-strip is determined by the x-strip that bounds the subdivision. The display stack is built at step 198 as follows. The x-strips are sorted in order of increasing Y, and the subdivisions within each x-strip in order of increasing X, again reflecting the raster scan of a display. There is a single element in the data structure for each x-strip, containing its starting Y position and its height (in Y) and containing an array of elements for the member subdivisions in the x-strip. There is a single element in this array for each member subdivision, each containing its starting X and Y pixel position and its length (in X).

Now, with the current display stack complete, it is ready to be loaded into stack buffer 130 to replace display data reflecting the previous view position of the viewer. In the preferred embodiment, the display stack is double-buffered in stack buffer memory 130, making timing of transfer of the data less critical. The parsing routine transfers the current display stack into the inactive buffer at step 200 and enables it as the next active buffer at the end of the current display refresh at step 202.

If the application in which this embodiment is used, has little or no change in the number of objects or absolute positions of these objects apart from initialization, then precomputed display stacks, which are relatively small data, may be cached in the computer's system memory 54. After sampling the viewer positions at step 180, the corresponding cached display stack is installed into stack buffer memory 130. Processing time may be traded for system memory 54 and the stack buffer build process may be bypassed.

Image Data Display Process

Figure 8:
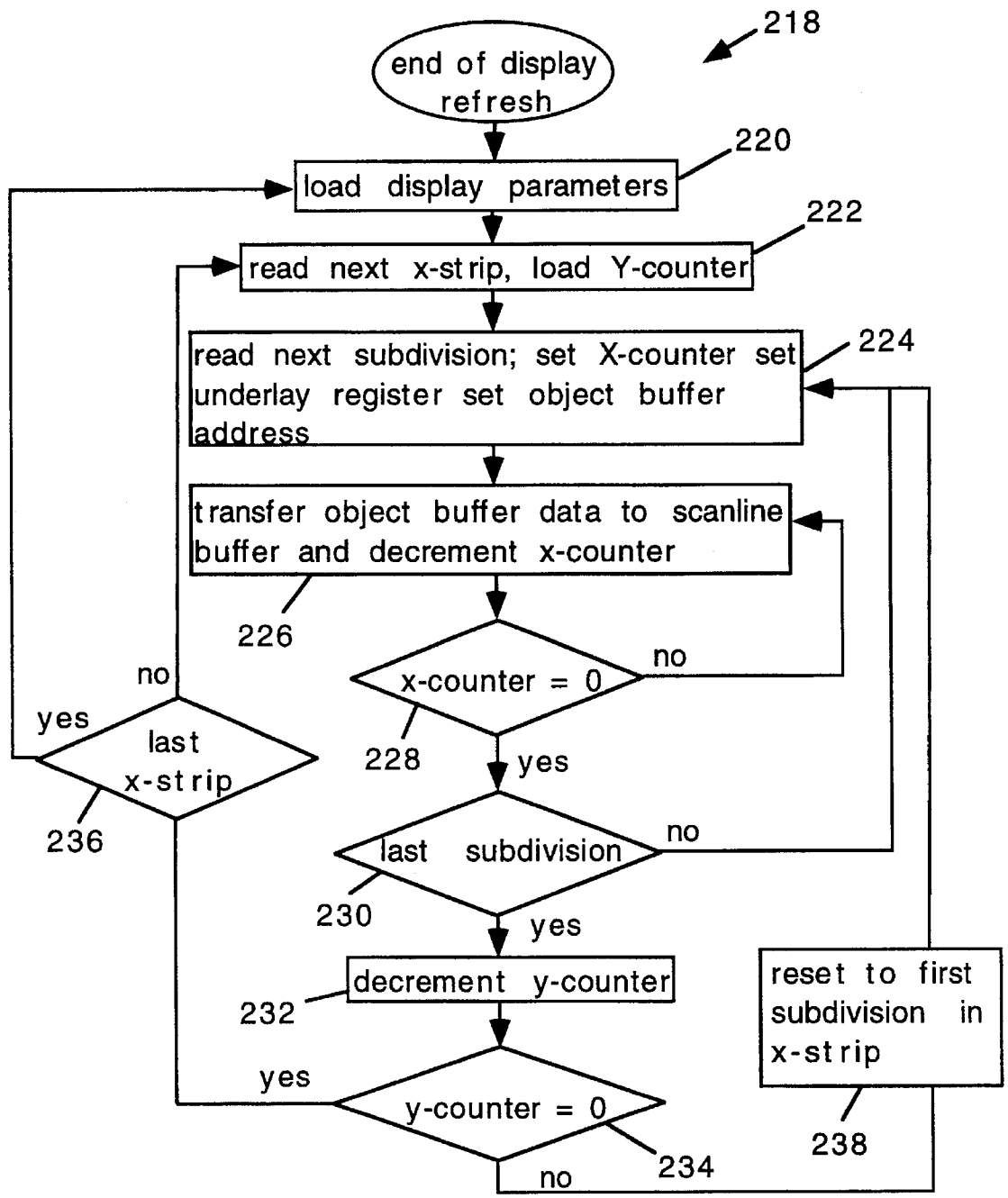
FIG. 8 is an illustration of the image data display process.

The second of the display related processes is the image data display process 218, shown in FIG. 8. Unlike the first process which is carried out by the parsing routine, the image data display process 218 is carried out by parallax controller 132 and its related components. The process will now be described.

Referring to FIG. 8, at the end of display refresh, at step 220, parallax controller 132 reads the video compositor display parameters from section 1 of stack buffer 130 to determine the active display stack for the next display refresh and to load its internal X and Y display counters. Rather than wait for start of display refresh, parallax controller 132 immediately reads the active display stack to begin staging the display data in scanline buffer 118 in advance.

With the display parameters loaded at step 220, the read operation begins with parallax controller 114 reading the first x-strip data element, loading an internal Y counter that counts down the height of the current x-strip as each horizontal line of x-strip image data is transferred to scanline buffer 118 at step 222. Immediately after, parallax controller 132 reads the first subdivision data element in the first x-strip data element into an internal X counter. This X counter counts down the width of the current subdivision as each pixel of the subdivision on the current horizontal line is transferred by parallax controller 132 from object buffer 116 into scanline buffer 118 at step 224. Object buffer 116-related addressing data (xstart and ystart) is read from the current subdivision data element (struct subdivision) to address object buffer 116. This includes the underlay level and starting address of the subdivision.

The transfer of image data begins at step 226. Parallax controller 114 decrements the internal X counter after each transfer until the currently read horizontal line of data is transferred for the current subdivision. This process is continued for every subdivision across a horizontal line until that line is complete. The internal Y counter is then decremented at step 232 indicating the completion of the line. If the Y counter is non-zero (step 234), then the process is repeated until the x-strip is completed. The entire process is carried out until all of the image data from all of the x-strips of the active display stack are transferred into scanline buffer 118 in raster order. Concurrent with this process, scanline buffer 118 is read out by parallax controller 114 for presentation to color palette and DAC 70 using its internal X and Y display counters.

A simpler version of either of the three previously described embodiments, operates with the same methods described. The simplification is that all objects reside on the same plane in three dimensional space. The resulting visual effect is a panning of the plane corresponding to changes in view position. (The extent of the plane is assumed to be larger than the extent of the display).

Forth Embodiment—Parallax Engine Applied to Stereoscopic Display

The forth embodiment described herein differs from the third embodiment in one respect. The images produced for display are constructed for alternate display between the left and right eye of the viewer producing stereoscopic display. By using algorithms well-known in the art (Hodges, Larry F., "Tutorial: Time-multiplexed Stereoscopic Computer Graphics" IEEE Computer Graphics and Applications, Vol 12, pp. 20–30, Mar. 1992), the same processes are used as described in the third embodiment with two modifications.

The first modification is that the transform matrix in step 182, is composed alternately for each display refresh interval for left and right eye. This modification will result in a display stack that will produce an image alternately for left and right eye as is required for the effect of stereoscopic display. Note that the objects need not be rendered twice for both eye images as with conventional stereoscopic display systems. The second modification requires the parsing routine to notify external stereoscopic display hardware external to computer 26, typically shutter glasses worn by the viewer, for which eye the current display is intended.

The resultant system provides a stereoscopic display which provides the viewer using minimal additional hardware with a perception that images are both in front of the physical display surface as well as behind. Furthermore, the lag between view position sampling and displayed image is never greater than one refresh display period. Furthermore, the update rate of new images equals the refresh rate of the display.

Fifth Embodiment—Animation

It should be noted that in the third and forth embodiment, discussion was limited to a single object image for each object. However, the architecture lends itself to supporting multiple images of the same object. By defining multiple images for an object in the window map, allocating for them from the tile allocation table, and rendering them in object buffer 116, the object can be animated at display refresh rates by cycling through the images. Based on the images rendered into object buffer 116, the animation can reflect motion of an object, view angle change between the object and viewer, and various other effects used in the art of animation.

Sixth Embodiment—Zoom

With regard to each of the aforementioned embodiments, it is possible to provide the additional visual clue zoom to the display. That is, it is possible to determine the distance between the viewing position and the monitor, and adjust the size of the objects displayed on the monitor accordingly. Where zoom is desired in any of the previously described embodiments, or as a stand alone embodiment, the distance between the viewing position and the monitor is determined using the view position sensing apparatus 36. This distance then becomes the basis for a scaling factor which in essence scales the displayed objects display up (larger) or down (smaller) to enhance the effect of the user moving toward or away from the display. The scaling factor may be applied as a part of the loading and sending of data into the shift register or scanline buffer for display.

While the invention has been described above with respect to the specific embodiments, those skilled in the art will appreciate that modifications may be made without departing from the spirit and scope of the invention. For example, one of virtually any appropriate type of range finding apparatus may be employed as view position sensing apparatus 36. Furthermore, the present description has been in terms of standard general purpose desk top computer systems and low-end graphics workstations. However, the teachings of the present invention will apply equally to certain appropriate architectures of dedicated video games, and other special purpose display generation apparatus, as will be appreciated by one skilled in the art. Therefore, the above specific descriptions are presented as examples of embodiments of the present invention, and are not to be read as limiting the scope of the invention claimed herein.

What is claimed is:

1. A system for displaying an image of a graphical object on a display device, the position at which the object is displayed being a function of the position from which a viewer views the display device so as to simulate an interactive, three-dimensional viewing environment, comprising:

an autoscopic display device;

a microprocessor for producing graphics instructions representing a current view of an object based on viewer position;

a graphics engine, connected to the microprocessor, for converting the graphics instructions into data capable of driving the display device;

a buffer, connected to the graphics engine and the display device, for storing the data;

means for determining the position of a viewer relative to the display device of a type wherein the viewer carries no required apparatus to enable the determining of viewer position;

means, connected to the means for determining viewer position, for determining the display position of the object based on the determined position of a viewer;

means, connected to the means for determining display position and to the buffer, for determining read-out order of the data such that the data may be used to generate a display of that part of the object, in the proper position, viewable from the viewer's position; and means, connected to the buffer, for controlling reading out of the data from the buffer in the order determined by the means for determining read-out order, so as to drive the display device to display only that part of the object, in the proper position, viewable from the viewer's position.

2. The system of claim 1, wherein said buffer comprises a first buffer, and the system further comprises a second buffer, and wherein the graphics engine is capable of selectively alternately writing to one buffer while the other buffer is being read out to drive the display device.

3. The system of claim 1, wherein at least two separate objects are displayed, each object to be displayed at a different apparent distance from the viewer, and the means for determining display position further determines the positions of the objects and the means for determining read-out order further determining the read-out order of the data such that the display of the objects exhibits parallax upon motion of the viewer.

4. The system of claim 3, wherein each of said objects are windows generated by a window-based application program.

5. In a video display system for dynamic display of graphical objects on a display device, an improved memory system with dynamic allocation, comprising:

a read-writable random access image memory for storing image data representing graphical objects;

a writable address translator for assigning generally non-contiguous portions of the image memory for storage of image data and for mapping the non-contiguous portions of the image memory into contiguous addresses for subsequent display of the image data.

6. A system for displaying images of graphical objects on a display device, the displayed portions and position of the objects being a function of the position from which a viewer views the display device so as to simulate an interactive, three-dimensional viewing environment, comprising:

an autoscopic display device;

a microprocessor producing graphics instructions representing all portions of an object viewable on the display device from any possible viewing position for any object to be displayed;

a graphics engine, connected to the microprocessor, for converting the graphics instructions into data capable of driving the display device;

a buffer, connected to the graphics engine and the display device, for storing the data;

means for determining the position of a viewer relative to the display device;

means, connected to the means for determining viewer position, for determining the display position of the object based on the determined position of a viewer;

means, connected to the means for determining display position and to the buffer, for determining read-out order of the data such that the data may be used to generate a display of that part of the object, in the proper position, viewable from the viewer's position; and means, connected to the buffer, for controlling reading out of the data from the buffer in the order determined by the means for determining read-out order, so as to drive the display device to display only that part of the object, in the proper position, viewable from the viewer's position.

7. The system of claim 6, wherein at least two separate objects are displayed, each object to be displayed at a different apparent distance from the viewer, and the means for determining display position further determines the positions of the objects and the means for determining read-out order further determining the read-out order of the data such that the display of the objects exhibits parallax upon motion of the viewer.

8. The system of claim 7, wherein each of said objects are windows generated by a window-based application program.

9. The system of claim 6, wherein the viewer carries no required apparatus to enable the means for determining viewer position to so determine viewer position.

10. A method for displaying on a display device an image of at least a portion of an object at a display position determined by the position from which a viewer views the object, such that the method provides a simulated interactive, three-dimensional viewing environment, comprising the steps of:

parsing image data representing multiple views of the object into a collection of individual tiles of a microprocessor-controlled memory, each tile storing a portion of the image data and display location information associated with that portion of the image data;

determining a view position from which the viewer will view the object as displayed on the display device;

determining which portions of the object are viewable from the view position, and where the viewable portions are to be displayed on the display device;

building a stack buffer, as an ordered stack of memory addresses of tiles, capable of providing properly ordered image data to result in display of the at least a portion of the object in the proper position on the display device; and reading out the contents of the tiles, in the order corresponding to the order of addresses in the stack buffer, to a display device driving apparatus so as to generate an appropriate display.

11. The method of claim 10, wherein the method displays at least portions of a first object and a second object simultaneously on the display device, the first object located at a first virtual distance from the viewer, the second object located at a second virtual distance from the viewer which is less than the first virtual distance, and wherein a portion of the first object may be occluded by a portion of the second object, further comprising the step of:

determining from the viewing position which portion of the first object is occluded by the second object; and clipping the image data of the first object so that the addresses of the tiles storing portions of the image data for the first object in the stack buffer are only the addresses of those tiles storing data representing non-occluded portions of the first object from the viewing position.

12. The method of claim 11, wherein the extent that the first object is occluded by the second object varies as a function of the virtual distances between the viewer and first and second objects such that motion of the viewer from a first viewing position to a second viewing position results in a simulation of parallax motion between the first and second objects on the display device.

13. The method of claim 11, further comprising the steps of:

establishing a tile allocation table in which allocation of parts of the object buffer into tiles is recorded such that a list of allocated tiles and a list of allocable tiles is maintained in the table;

determining, from a preestablished size of the object to be displayed and from a preestablished size of the tiles, the number of tiles required to store the image data and display location information;

if the number of allocable tiles exceeds the number of tiles required to store the image data and display location information, allocating tiles for storing a portion of the image data and display location information associated with that portion of the image data; and if the number of tiles required to store the image data and display location information exceeds the number of allocable tiles, merging the contents of selected tiles associated with the first object together with all tiles associated with the second object, and adding to the list of allocable tiles the nonmerged tiles associated with the first object, so that the number of allocable tiles exceeds the number of tiles required to store the image data and display location information, then allocating tiles for storing a portion of the image data and display location information associated with that portion of the image data.

14. The method of claim 13, wherein the first object is the object having the largest virtual distance from the viewer, and the selected tiles are those tiles storing image data and display location information corresponding to portions of the first object which, based on the determined viewing position, will be displayed.

15. The method of claim 10, wherein the method displays the image on each of two display devices, one display device for displaying the image to a viewer's left eye, and the other display device for displaying the image to a viewer's right eye, and further wherein the stack buffer is built and read out first for display to the viewer's left eye and next is built and read out for display to the viewer's right eye, without requiring parsing of image data into tiles between the steps of building and read out of the stack buffer for the left eye and the steps of building and read out of the stack buffer for the right eye.

16. In a method of displaying an image of an object by selecting certain object data from a collection of such object data stored in an object buffer, a method of transforming a first image of the object as viewed from a first viewing position to a second image of the object as viewed from a second viewing position different that the first viewing position, the data for both the first and second images being selected from the same collection of object data, comprising the steps of:

determining which data from the collection of data represent viewable portions of the object from the first viewing position;

generating, from the data determined to represent viewable portions of the object from the first viewing position, a first ordered list of the addresses of the data from the collection of data such that a sequential reading out of the data at the addresses in the first ordered list is capable of driving a display device to display the first image;

determining the change in position between the first and second viewing positions;

determining, using the determined change in position, which data from the collection of data represent viewable portions of the object from the second viewing position; and generating, from the data determined to represent viewable portions of the object from the second viewing position, a second ordered list, different than the first ordered list, of the addresses of the data from the collection of data such that a sequential reading out of the data at the addresses in the second ordered list is capable of driving a display device to display the second image.

17. The method of claim 16, wherein the method displays at least portions of a first object and a second object simultaneously on the display device, the first object located at a first virtual distance from the viewer, the second object located at a second virtual distance from the viewer which is less than the first virtual distance, and wherein a portion of the first object may be occluded by a portion of the second object, further comprising the step of:

determining from the change in viewing position which portion of the first object is occluded by the second object in the second viewing position; and clipping the image data of the first object so that the addresses of the data for the first object in the second ordered list are only those addresses for data representing nonoccluded portions of the first object from the second viewing position.

18. The method of claim 17, wherein the extent that the first object is occluded by the second object varies as a function of the virtual distances between the viewer and first and second objects such that motion of the viewer from a first viewing position to a second viewing position results in a simulation of parallax motion between the first and second objects on the display device.

* * * * *